United States Patent
Chang et al.

(10) Patent No.: US 7,849,166 B1
(45) Date of Patent: Dec. 7, 2010

(54) CREATION OF SECURE COMMUNICATION CONNECTIONS THROUGH COMPUTER NETWORKS

(75) Inventors: Chia-Chi Chang, Taipei (TW); Kun-Shan Lin, Taipei (TW); Pei-Chun Yao, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 219 days.

(21) Appl. No.: 12/008,484

(22) Filed: Jan. 11, 2008

(51) Int. Cl.
 *G06F 15/16* (2006.01)
(52) U.S. Cl. .................. 709/220; 709/224; 709/228; 713/513
(58) Field of Classification Search .......... 709/206, 709/224, 228, 220, 227, 229; 713/513
See application file for complete search history.

(56) References Cited

U.S. PATENT DOCUMENTS

| | | | |
|---|---|---|---|
| 5,862,203 A * | 1/1999 | Wulkan et al. | 379/114.02 |
| 6,591,306 B1 * | 7/2003 | Redlich | 709/245 |
| 6,654,792 B1 * | 11/2003 | Verma et al. | 709/208 |
| 6,795,700 B2 | 9/2004 | Karaoguz et al. | |
| 6,826,627 B2 * | 11/2004 | Sjollema et al. | 709/250 |
| 6,885,859 B2 | 4/2005 | Karaoguz et al. | |
| 7,046,989 B2 | 5/2006 | Karaoguz et al. | |
| 7,120,420 B2 | 10/2006 | Karaoguz et al. | |
| 7,130,646 B2 | 10/2006 | Wang | |
| 7,146,153 B2 | 12/2006 | Russell | |
| 7,222,175 B2 | 5/2007 | Knauerhase et al. | |
| 7,260,379 B2 | 8/2007 | Karaoguz et al. | |
| 7,272,397 B2 | 9/2007 | Gallagher et al. | |
| 7,283,822 B2 | 10/2007 | Gallagher et al. | |
| 7,295,540 B2 | 11/2007 | Joong et al. | |
| 7,295,542 B2 | 11/2007 | Xu | |
| 7,302,229 B2 | 11/2007 | Riddles | |
| 7,305,245 B2 | 12/2007 | Alizadeh-Shabdiz et al. | |
| 7,480,794 B2 * | 1/2009 | Kersey et al. | 713/153 |

* cited by examiner

*Primary Examiner*—Khanh Q Dinh
(74) *Attorney, Agent, or Firm*—Okamoto & Benedicto LLP

(57) ABSTRACT

To protect a user computer from eavesdroppers, a secure communication connection is created through a computer network. The secure communication connection may be created even when the user computer communicates with a web server computer that does not support secure communication connections. The secure communication connection may be to a protection server computer. Another communication connection may be formed between the protection server computer and the web server computer to allow the user computer to transfer data to the web server computer by way of the protection server computer. The creation of the secure communication connection may be by user request or automatic upon detection of protected address or data.

26 Claims, 8 Drawing Sheets

US 7,849,166 B1

CREATION OF SECURE COMMUNICATION CONNECTIONS THROUGH COMPUTER NETWORKS

BACKGROUND OF THE INVENTION

1. Field of the Invention

The present invention relates generally to computer security, and more particularly but not exclusively to methods and apparatus for computer network communications.

2. Description of the Background Art

Computer networks allow remotely located computers to communicate with one another. For example, a user may connect his computer to the Internet to access web servers from around the world. These web servers host websites that provide various types of information as well as online services. A computer may connect to the Internet or other computer network using a wired or wireless connection. Regardless of the type of network connection, there is always the threat of an eavesdropper listening on the connection to steal confidential information. This threat becomes more significant as the popularity of publicly accessed network connections, such as hotspots and other unfamiliar connections (e.g., those provided by hotels), increases. The present disclosure identifies how an eavesdropper may tap into a communication connection and provides solutions for combating this threat.

SUMMARY

To protect a user computer from eavesdroppers, a secure communication connection is created through a computer network. The secure communication connection may be created even when the user computer communicates with a web server computer that does not support secure communication connections. The secure communication connection may be to a protection server computer. Another communication connection may be formed between the protection server computer and the web server computer to allow the user computer to transfer data to the web server computer by way of the protection server computer. The creation of the secure communication connection may be by user request or automatic upon detection of protected address or data.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
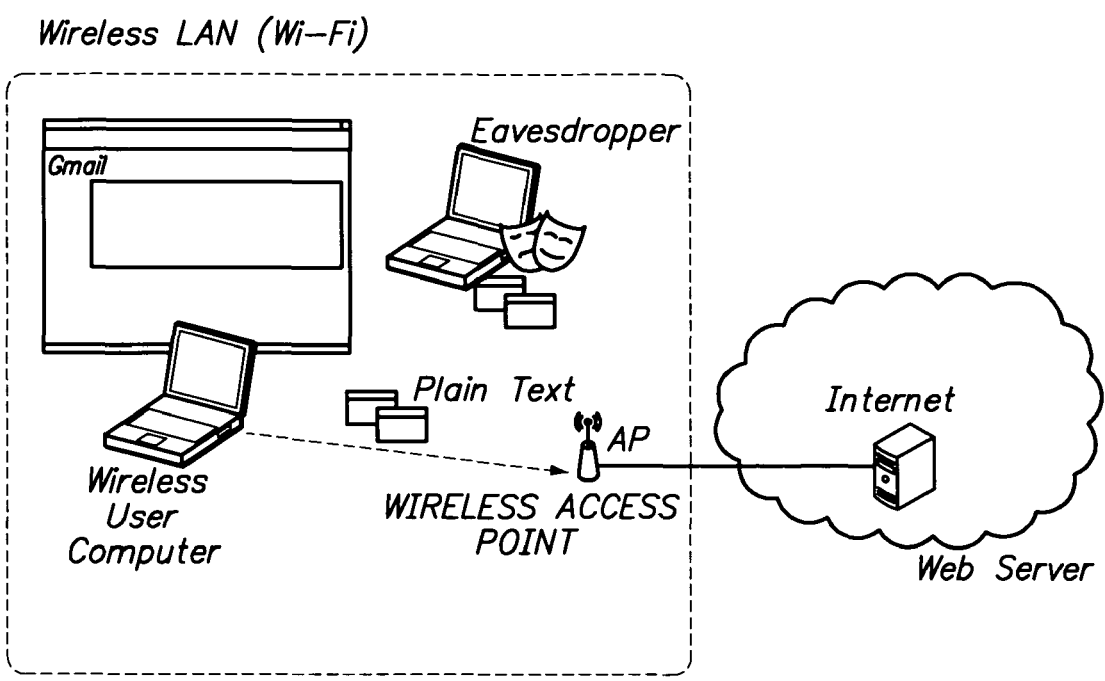
FIGS. 1 and 2 schematically show example public wireless computer networks that may be vulnerable to eavesdropping.

FIG. 1 schematically shows an example public wireless computer network that may be vulnerable to eavesdropping. The computer network of FIG. 1 is a wireless local area network (LAN) accessible by a wireless access point (AP). As is well known, a wired or wireless access point allows a computer to connect to a computer network. In the example of FIG. 1, a user computer wirelessly connects to the wireless LAN by connecting to the wireless access point. This allows the user computer to connect to the Internet from the wireless LAN. Like in other public computer networks, data packets from the user computer to the wireless access point are not encrypted. Data transmitted to the wireless access point are thus available to anyone within radio range of the access point. This allows a hacker (also referred to as "cyber criminal") to eavesdrop and readily obtain data transferred in plain text, such as those communicated to some websites and by FTP (file transfer protocol).

Figure 2:
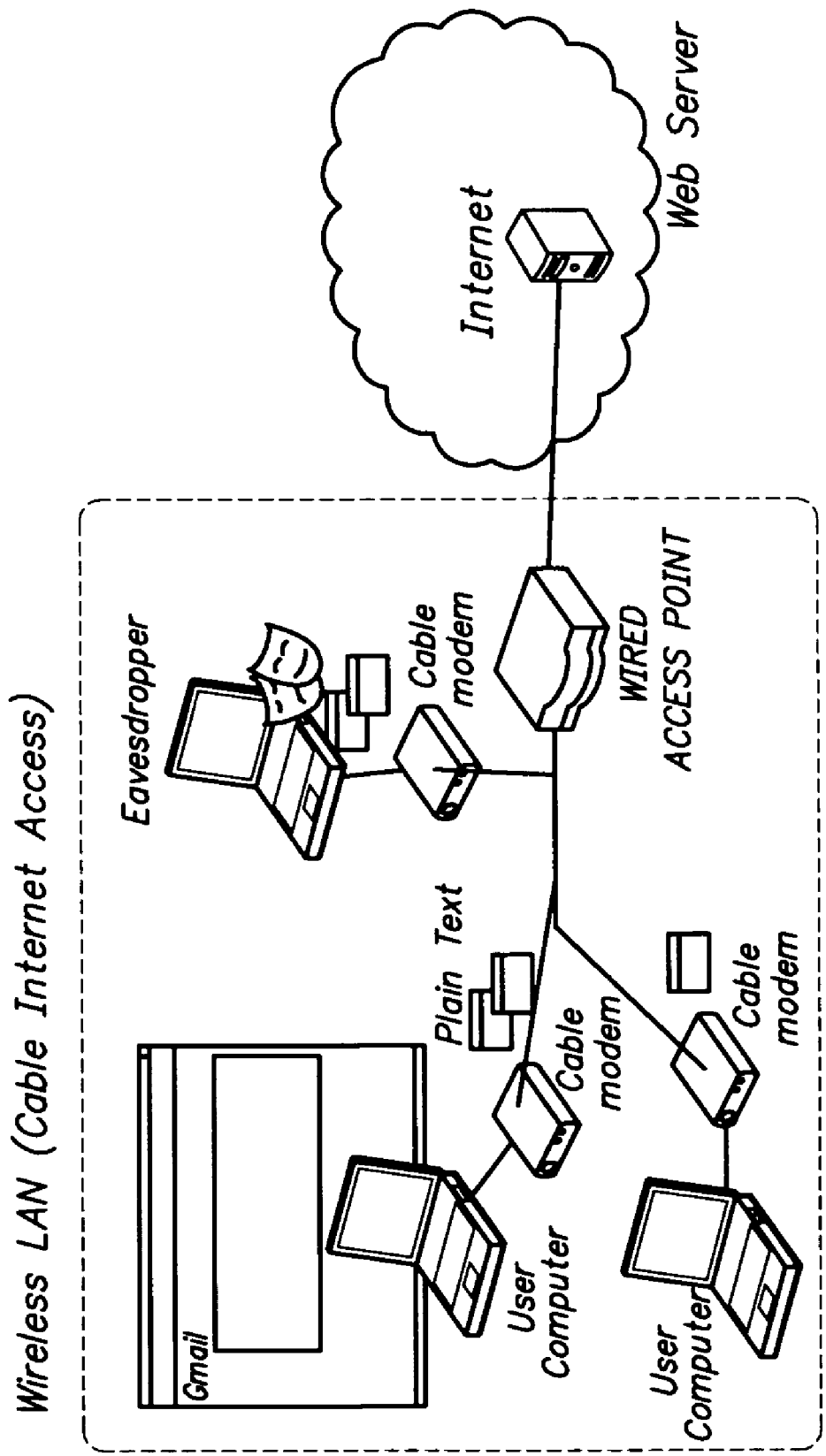

While less vulnerable to eavesdropping because of difficulty of tapping to a cable connection, a wired network is nevertheless susceptible to the same threat as in FIG. 1. In the example of FIG. 2, user computers of a wired LAN connect to web servers on the Internet by way of cable modems connected to a common wired access point, such as a gateway or router, by a common coaxial cable. If the connection between a cable modem and the gateway or router is not encrypted, a hacker may eavesdrop on the connection and steal data transmitted in plain text.

Figure 3:
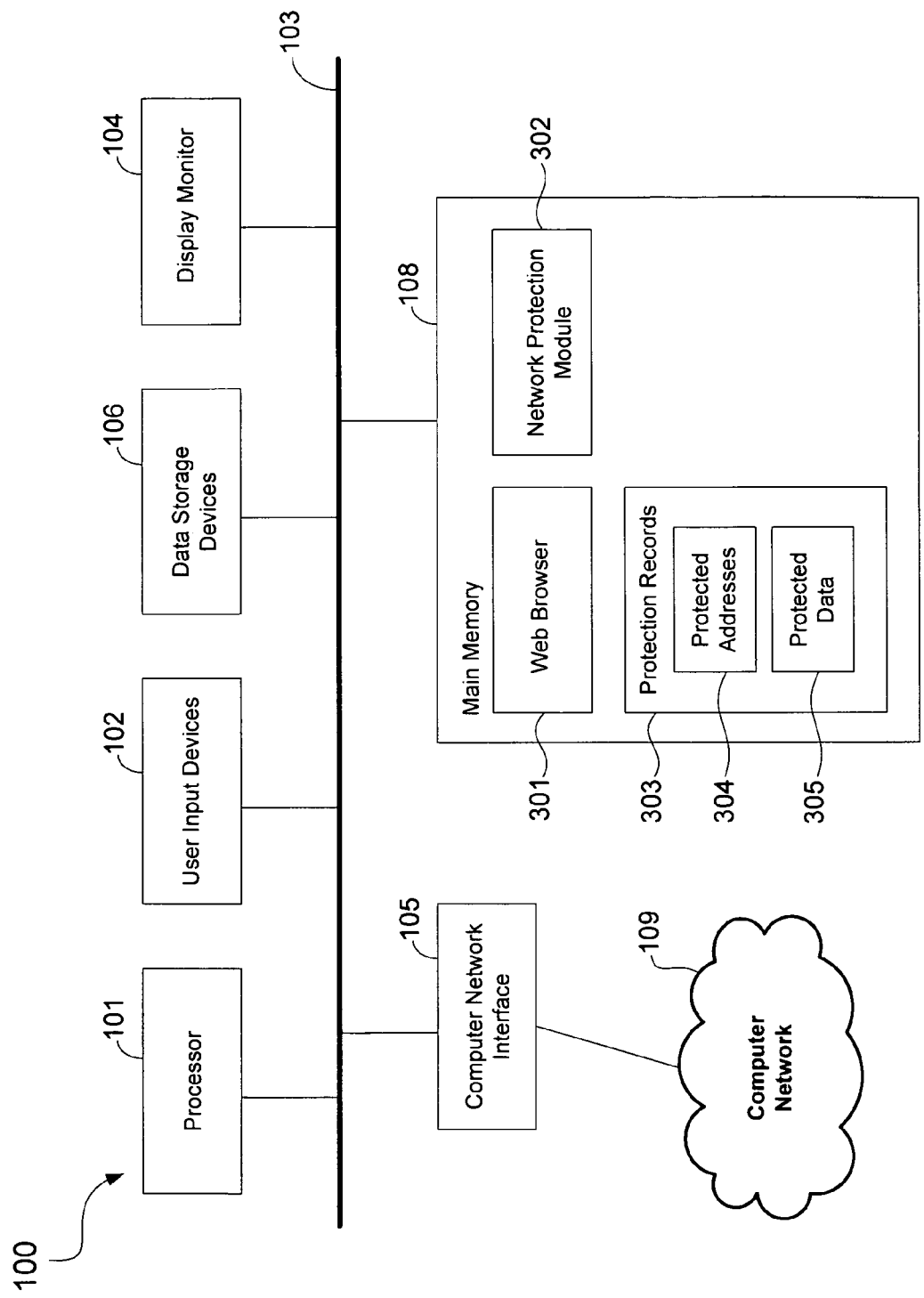
FIG. 3 schematically shows a user computer in accordance with an embodiment of the present invention.

Referring now to FIG. 3, there is shown a schematic diagram of a user computer 100 in accordance with an embodiment of the present invention. The computer 100 may be employed as a user computer configured to communicate with remotely located computers in other computer networks, such as the Internet. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be a wired or wireless computer network interface and may be coupled to a wired or wireless computer network 109.

In the example of FIG. 1, the main memory 108 includes a web browser 301, a network protection module 302, and protection records 303 comprising protected addresses 304 and protected data 305. The aforementioned software (i.e., computer-readable program code or data) components may be loaded from the data storage device 106 to the main memory 108 for execution by the processor 101.

The web browser 301 may comprise a commercially available web browser, such as the Microsoft Internet Explorer™ web browser. The web browser 301 may also be tailored made to implement the functionality provided by the network protection module 302. Web browsers are well known in the art and not further described here.

The network protection module 302 may comprise computer-readable program code for securely communicating with another computer automatically or on-demand by the user. In one embodiment, the network protection module 302 creates a secure (e.g., encrypted) communication connection to a protection server computer (e.g., protection server 703 of FIG. 7) that in turn creates a connection to a web server computer (or another computer) when the web server does not support a secure communication protocol, such as SSL (secure socket Layer). The network protection module 302 may create the secure communication connection to the protection server upon user demand or automatically upon detection of a connection to a protected address 304 or transfer of protected data 305. The network protection module 302 may also attempt to create a secure communication connection directly with the web server. The network protection module 302 may be implemented as a plug-in, integral to the web browser 301, or as a separate module, without detracting from the merits of the present invention.

The protection records 303 may comprise a listing of protected network addresses and data. In one embodiment, the listing of protected network addresses comprises URL (uniform resource locator) of web servers and stored as protected addresses 304, while the listing of protected data 305 comprises confidential or critical data. The protected data 305 may comprise credit card information, residence address, telephone number, and other information the user wants to protect from eavesdropping. The protection records 303 may be edited by the user to allow the user to designate protected addresses and data. The protection records 303 are preferably encrypted to prevent unauthorized tampering or viewing. The network protection module 302 may read the contents of the protection records 303 and automatically build a secure communication connection to the protection server or attempt to build a secure communication connection to a web server receiving protected data 305 or having a protected address 304 upon detection of transfer of the protected data 305 or navigation to the protected address 304.

Figure 4:
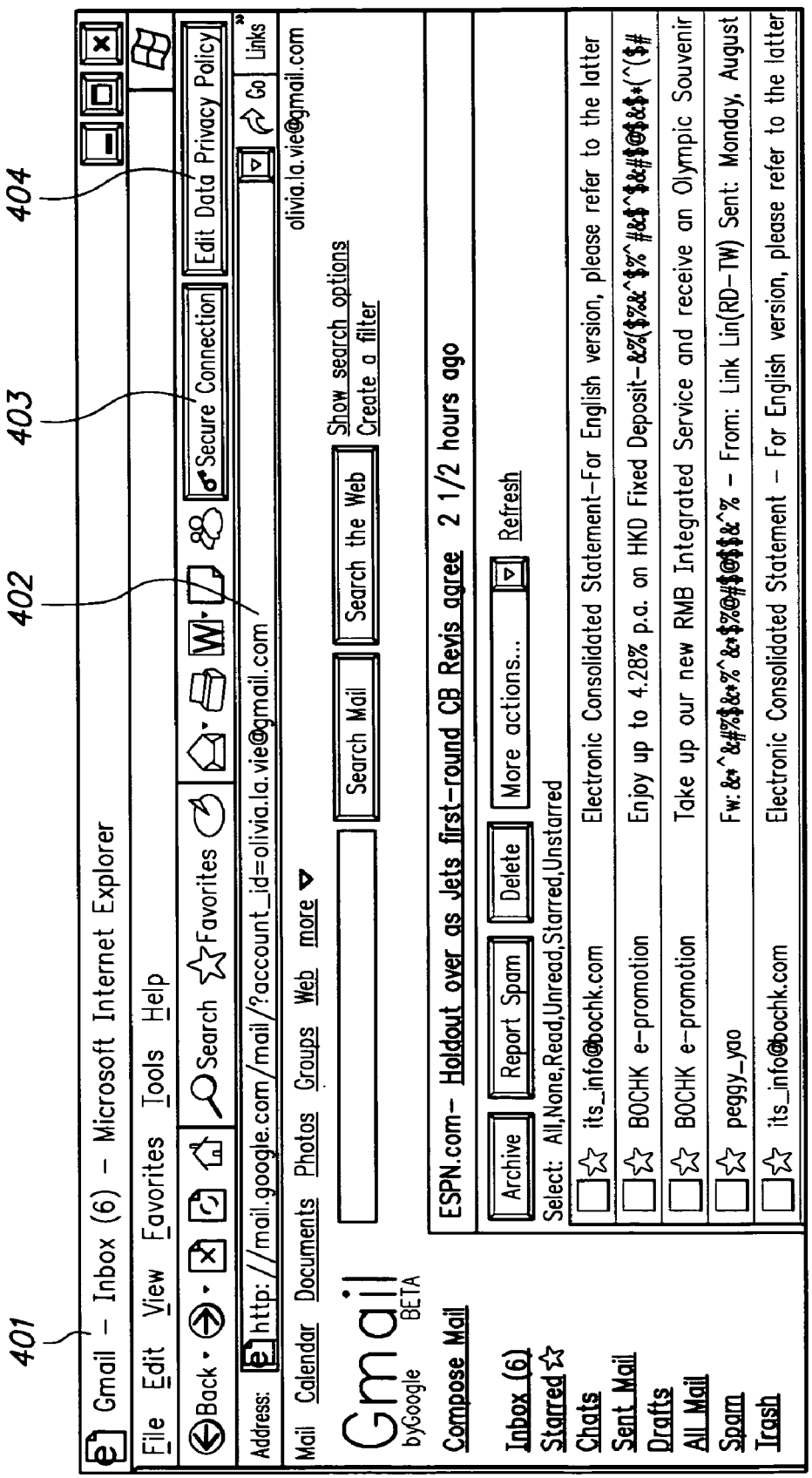
FIG. 4 schematically shows a browser window of a web browser in accordance with an embodiment of the present invention.

FIG. 4 schematically shows a browser window 401 of the web browser 301 in accordance with an embodiment of the present invention. In the example of FIG. 4, the browser window 401 includes a user interface 403 for allowing the user to request a secure communication connection and a user interface 404 for allowing the user to edit the contents of the protection records 303. For example, the user may activate (e.g., clicking using a mouse) the user interface 403 to request the network protection module 302 to create a secure communication either directly with a web server or through a protection server in the event the web server that does not support a secure communication connection. As another example, the user may activate the user interface 404 to enter protected data 305 or protected address 304, such as the URL 402 indicated in the address field of the browser window 401, in the protection records 303.

Figure 5:
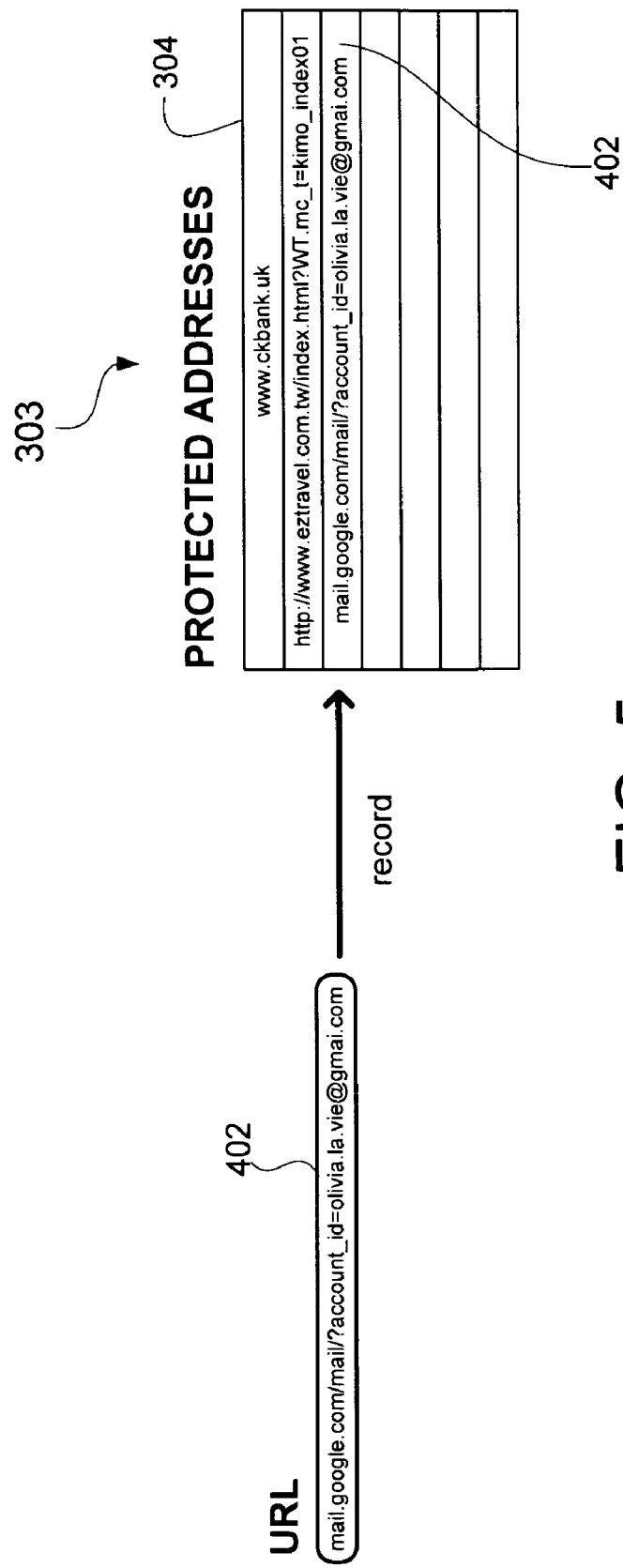
FIG. 5 schematically shows the recording of a URL as a protected address in protection records in accordance with an embodiment of the present invention.

FIG. 5 schematically shows the recording of the URL 402 as a protected address 304 in the protection records 303. The network protection module 302 may be configured to monitor the URLs being visited by the user and, upon detection of a URL included in the protection records 303, automatically create a secure communication connection to the protection server that in turn connects to the web server having the URL when the web server does not support a secure communication connection. In the example of FIG. 5, the protection records 303 include three protected addresses 304. The protection records 303 may include less or more protected addresses 304.

Figure 6:
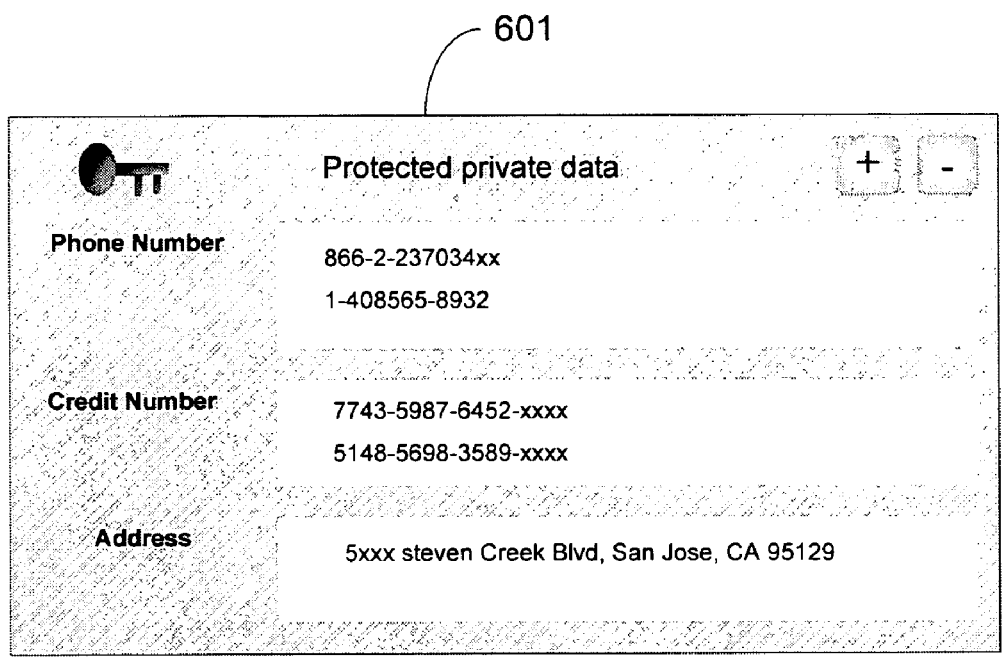
FIG. 6 schematically shows an example user interface for entering protected data into protection records in accordance with an embodiment of the present invention.

FIG. 6 schematically shows an example user interface for entering protected data 305 into the protection records 303. In the example of FIG. 6, the protected data 305 include phone numbers, credit card numbers, and an address. The network protection module 302 may be configured to monitor data transferred from the computer 100 to another computer to look for protected data 305. Upon detection of transfer of protected data 305, the network protection module 302 may automatically create a secure communication connection directly with the other computer or to the protection server that in turn connects to the other computer when the other computer does not support a secure communication connection.

Figure 7:
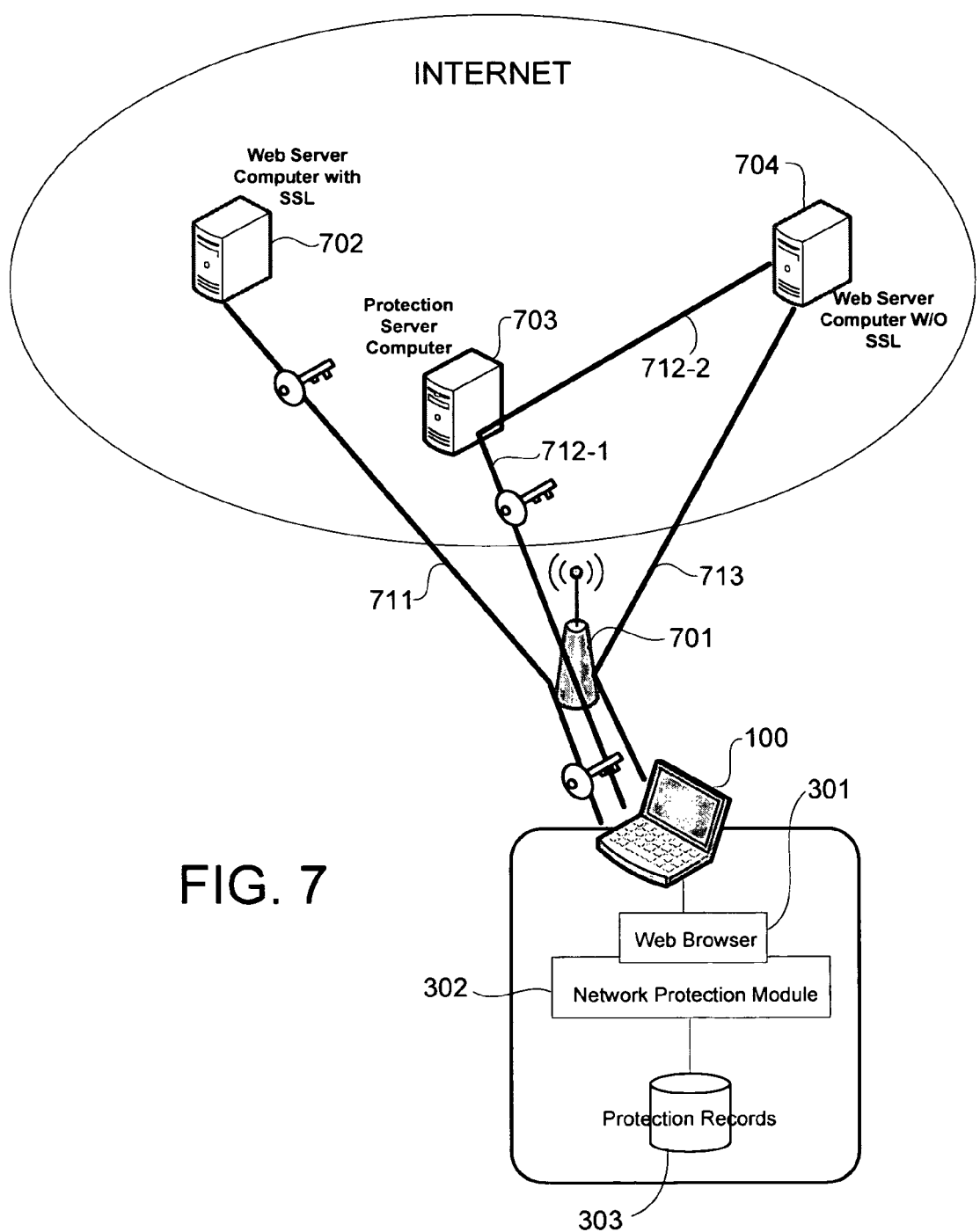
FIG. 7 schematically illustrates the operation of the user computer of FIG. 3 in accordance with an embodiment of the present invention.

FIG. 7 schematically illustrates the operation of the computer 100 in accordance with an embodiment of the present invention. In the example of FIG. 7, a user surfs the Internet using the web browser 301, which operates in conjunction with the network protection module 302. The network protection module 302 is configured to monitor the browsing activity of the user, including URLs of web servers visited and data to be transferred to the web servers. The network protection module 302 reads the contents of the protection records 303 to detect protected addresses 304 and protected data 305.

In the example of FIG. 7, the computer 100 wirelessly communicates with other computers on the Internet by way of a wireless access point 701. The wireless access point 701 may be part of a public hotspot providing Internet connection. As explained with reference to FIG. 1, this leaves the computer 100 vulnerable to an eavesdropper within radio range of the wireless access point 701. Such an eavesdropper may steal confidential data transmitted between the computer 100 and the wireless access point 701.

In a first scenario, the computer 100 communicates with a web server 702 that supports a secure communication connection. In this scenario, the computer 100 communicates with the web server 702 in accordance with SSL (secure socket layer) protocol over the secure communication connection 711. The secure communication connection 711 prevents eavesdroppers from listening in on data transmitted to and from the computer 100.

In a second scenario, the computer 100 communicates with a web server 704 over an unsecure communication connection 713. The web server 704 does not support a secure communication connection. In this scenario, the computer 100 does not transfer protected data to the web server 704 and the address of the web server 704 is not included in the protection records 303. Accordingly, use of an unsecure communication connection 713 does not pose any real danger to the computer 100.

In a third scenario, the computer 100 communicates with the web server 704, which in this example still does not support a secure communication connection. However, in this scenario, the computer 100 communicates with the web server 704 by way of the protection server 703. For example, the protection server 703 may be configured to serve as a proxy for the computer 100. In one embodiment, the network protection module 302 is configured to create a secure communication connection 712-1 between the computer 100 and the protection server 703. For example, the protection module 302 may be configured to communicate with the protection server 703 using a secure communication protocol, such as SSL (secure socket layer). The network protection module 302 may hook data in kernel mode, encrypt the data, and forward the encrypted data to the protection server 703 over the secure communication connection 712-1. Alternatively, the secure communication connection 712-1 may be a secure tunnel.

The protection server 703 may be operated by the vendor of the network protection module 302. The protection server 703 may be configured to provide proxy service only to subscribing computers.

Still referring to FIG. 7, the network protection module 302 may create the secure communication connection 712-1 between the computer 100 and the protection server 703 through the wireless access point 701 upon detection of a protected address 304, detection of protected data 305, and/or request by the user (e.g., activation of the user interface 403 shown in FIG. 4). The protection server 703 may be configured to detect and accept a secure communication connection request from the network protection module 302. The protection server 703 may receive configuration information from the network protection module 302 including authentication code (to verify the computer 100) and the address of the computer the computer 100 wants to connect to, which in this example is the web server 704. The protection server 703 may then create a connection 712-2 to the web server 704 and serve as a proxy for the computer 100. This allows the user to browse the contents of the web server 704 by way of the protection server 703.

Because the web server 704 does not support a secure communication connection, the connection 712-2 is not secure. However, the possibility of an eavesdropper on the connection 712-2 is much lower because of its distance from the wireless access point 701 and the protection server 703 is preferably configured to have unshared wired connections at least to a gateway or router to the Internet. Note that although the wireless access point 701 is publicly accessible and possibly monitored by eavesdroppers, the computer 100 communicates through the wireless access point 701 by way of the secure communication connection 712-1. This allows the user of the computer 100 to safely connect to the Internet through the wireless access point 701.

Figure 8:
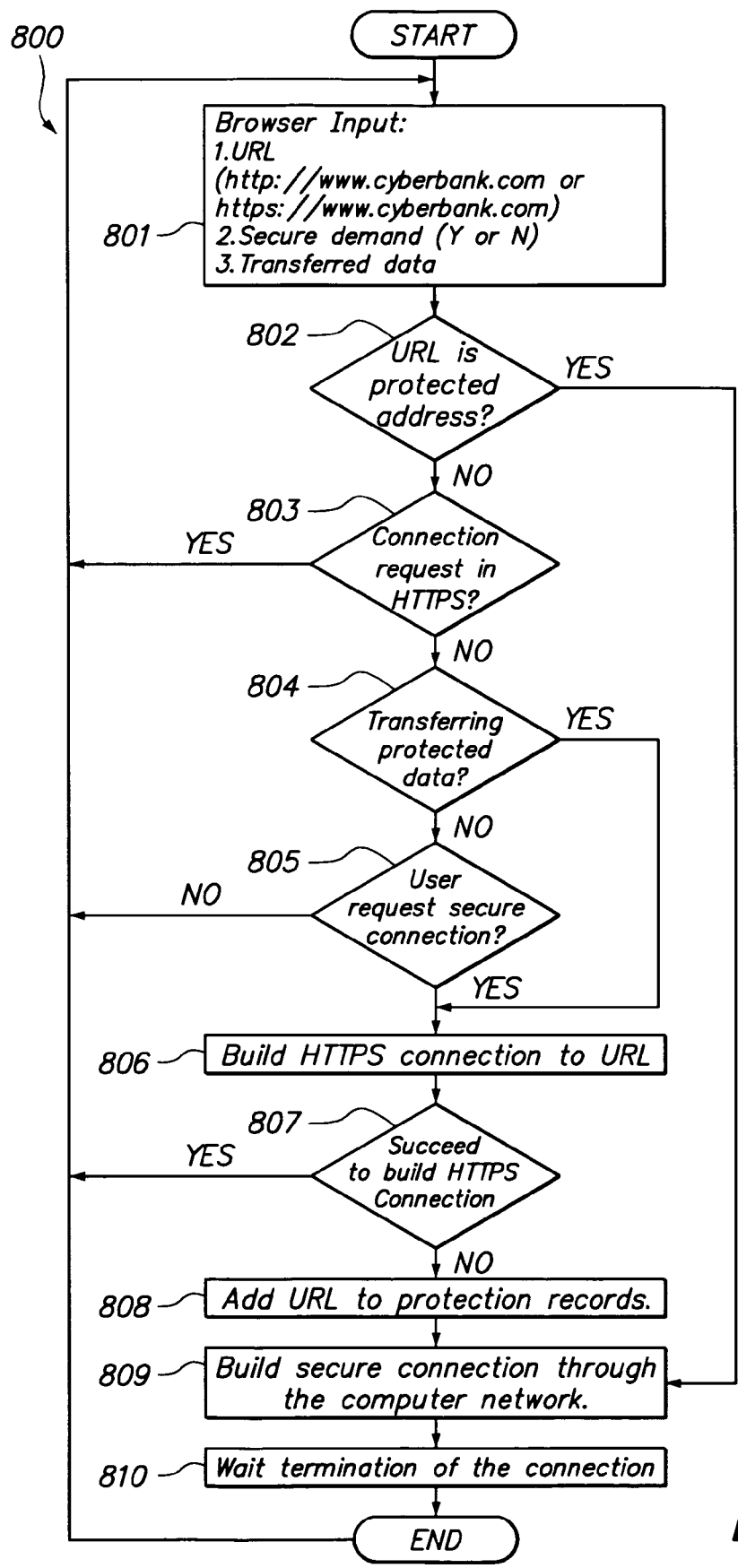
FIG. 8 schematically shows a flow diagram of a method of creating a secure communication connection through a computer network in accordance with an embodiment of the present invention.

Referring now to FIG. 8, there is shown a flow diagram of a method 800 of creating a secure communication connection through a computer network in accordance with an embodiment of the present invention. The method 800 is explained using the components of the computer 100 as an example. More specifically, the method 800 may be performed by the network protection module 302. Other components may also be used without detracting from the merits of the present invention.

In the example of FIG. 8, the user of the computer 100 uses the web browser 301 to attempt to connect to a web server on the Internet. The computer 100 connects to the Internet by way of a wireless or wired access point of the computer network. The network protection module 302 listens for web browser events by way of a browser helper object, for example. The network protection module 302 receives from the web browser 301 (a) the URL of the web server, (b) an indication as to whether the user requests a secure communication connection, and (c) data to be transferred to the web server (block 801). If the URL is a protected address 304 as indicated by the protection records 303, the network protection module 302 automatically builds a secure communication connection through the computer network by way of the access point (step 802 to step 809). In one embodiment, the secure communication connection goes to the protection server 703 (see FIG. 7), which in turn connects to the web server as a proxy for the computer 100. The secure communication connection through the computer network and to the protection server 703 may be in accordance with a communication protocol that supports encryption, such as SSL, while the communication connection between the protection server 703 and the web server is not secure in this example.

If the URL is not a protected address 304, the network protection module 302 determines if the connection request from the user computer 100 to the web server is in accordance with a secure communication protocol (step 802 to step 803). If so, communication with the web server is relatively secure and the network protection module 302 waits for next inputs from the web browser 301 (step 803 to step 801).

If the connection request from the user computer 100 to the web server is not in accordance with a secure communication protocol, the network protection module 302 checks if data to be transferred to the web server are protected data (step 803 to step 804). If so, the network protection module 302 automatically attempts to build a secure communication connection with the web server (step 804 to step 806). If the network protection module 302 is successful in building a secure communication connection with the web server, the connection to the web server is relatively secure and the network protection module waits for next inputs from the web browser 301 (step 807 to step 801). Otherwise, the network protection module 302 adds the URL of the web server to the protection records 303 as a protected address 304 (step 807 to step 808) and builds a secure communication connection through the computer network (step 809) to the protection server 703.

The network protection module 302 checks if the user has requested a secure communication connection when the data to be transferred to the web server are not protected data 304 (step 804 to step 805). If the user requested a secure communication connection (step 805 to step 806), the network protection module 302 performs the steps of attempting to build a secure communication connection with the web server (step 806), adding the URL of the web server to the protection records 303 if not successful in building the secure communication connection (step 808), and building a secure communication connection through the computer network to the protection 703 (step 809) if not successful in building a secure communication connection with the web server. Otherwise, the network protection module 302 waits for next inputs from the web browser 301 (step 805 to step 801).

The network protection module 302 maintains any created secure communication connection until termination of the communication with the web server (step 810).

While specific embodiments of the present invention have been provided, it is to be understood that these embodiments are for illustration purposes and not limiting.

Many additional embodiments will be apparent to persons of ordinary skill in the art reading this disclosure.

What is claimed is:

1. A method of creating a secure communication connection through a computer network, the method comprising:
discovering that a first server computer does not support a secure communication connection that allows for encrypted communication;
creating a secure communication connection from a user computer to a second server computer by accessing a local area network (LAN), the secure communication connection allowing for encrypted communication, the LAN being configured to allow the user computer to communicate with the second server computer over the Internet; and
creating an unsecure communication connection from the second server computer to the first server computer to allow the user computer to communicate with the first server computer over the secure communication connection through the LAN;
wherein the creation of the secure communication connection from the user computer to the second server computer is automatically performed in response to detection of transfer of particular data specifically designated by a user of the user computer.

2. The method of claim 1 wherein the LAN is a publicly accessible wireless LAN.

3. The method of claim 1 wherein the secure communication connection from the user computer to the second server computer is in accordance with SSL.

4. The method of claim 1 wherein access to the LAN is by way of a wireless access point.

5. The method of claim 1 wherein access to the LAN is by way of a wired access point.

6. A user computer having memory and a processor configured to execute computer-readable program code in the memory, the memory comprising:
a web browser configured to access contents from a web server on the Internet;
a network protection module configured to create a first communication connection to a protection server through a computer network to allow the user computer to communicate with the web server by way of the protection server when the web server does not support a secure communication connection using an encrypted communication protocol, the first communication connection being in accordance with the encrypted communication protocol; and
protection records comprising a listing of URLs of web servers on the Internet;
wherein the network protection module is configured to automatically create the first communication connection when a URL of the web server is indicated in the protection records.

7. The user computer of claim 6 wherein the protection server is configured to create a second communication connection from the protection server to the web server.

8. The user computer of claim 6 wherein the user computer connects to the computer network by way of a wireless access point.

9. The user computer of claim 6 wherein the user computer connects to the computer network by way of a wired access point.

10. The user computer of claim 6 wherein the encrypted communication protocol comprises SSL.

11. A method of creating a secure communication connection through a computer network, the method comprising:
providing a user interface for requesting creation of a secure communication connection through a computer network;
determining if a user of a user computer activates the user interface to specifically request the creation of the secure communication to access a web server computer on the Internet; and
creating the secure communication connection to connect to the computer network to communicate over the Internet and send data from the user computer to the web server computer when the user activates the user interface;
wherein the creation of the secure communication connection is automatically performed when the URL of the web server is designated by the user to trigger creation of the secure communication connection even if the user does not activate the user interface.

12. The method of claim 11 wherein the secure communication connection is to a protection server configured to serve as a proxy for the user computer in communicating with the web server computer when the web server computer does not support secure communication connections.

13. The method of claim 11 wherein access to the computer network is by way of a wireless access point.

14. A method of creating a secure communication connection through a computer network, the method comprising:
discovering that a first server computer does not support a secure communication connection that allows for encrypted communication;
creating a secure communication connection from a user computer to a second server computer by accessing a local area network (LAN), the secure communication connection allowing for encrypted communication, the LAN being configured to allow the user computer to communicate with the second server computer over the Internet; and
creating an unsecure communication connection from the second server computer to the first server computer to allow the user computer to communicate with the first server computer over the secure communication connection through the LAN;
wherein the creation of the secure communication connection from the user computer to the second server computer is automatically performed when an address of the first server computer is specifically designated by a user of the user computer.

15. The method of claim 14 wherein the LAN is a publicly accessible wireless LAN.

16. The method of claim 14 wherein the secure communication connection from the user computer to the second server computer is in accordance with SSL.

17. The method of claim 14 wherein access to the LAN is by way of a wireless access point.

18. The method of claim 14 wherein access to the LAN is by way of a wired access point.

19. A user computer having memory and a processor configured to execute computer-readable program code in the memory, the memory comprising:
a web browser configured to access contents from a web server on the Internet;
a network protection module configured to create a first communication connection to a protection server through a computer network to allow the user computer to communicate with the web server by way of the protection server when the web server does not support a secure communication connection using an encrypted communication protocol, the first communication connection being in accordance with the encrypted communication protocol;

protection records comprising a listing of particular data;

wherein the network protection module is configured to automatically create the first communication connection when data included in the listing of particular data are to be transferred out of the user computer.

20. The user computer of claim 19 wherein the protection server is configured to create a second communication connection from the protection server to the web server.

21. The user computer of claim 19 wherein the user computer connects to the computer network by way of a wireless access point.

22. The user computer of claim 19 wherein the user computer connects to the computer network by way of a wired access point.

23. The user computer of claim 19 wherein the encrypted communication protocol comprises SSL.

24. A method of creating a secure communication connection through a computer network, the method comprising:

providing a user interface for requesting creation of a secure communication connection through a computer network;

determining if a user of a user computer activates the user interface to specifically request the creation of the secure communication to access a web server computer on the Internet; and creating the secure communication connection to connect to the computer network to communicate over the Internet and send data from the user computer to the web server computer when the user activates the user interface;

wherein the creation of the secure communication connection is automatically performed when data to be sent from the user computer to the web server computer are designated by the user to trigger creation of the secure communication connection even if the user does not activate the user interface.

25. The method of claim 24 wherein the secure communication connection is to a protection server configured to serve as a proxy for the user computer in communicating with the web server computer when the web server computer does not support secure communication connections.

26. The method of claim 24 wherein access to the computer network is by way of a wireless access point.

\* \* \* \* \*